T. H. MONK.
COTTON STALK PULLER.
APPLICATION FILED SEPT. 25, 1920.
1,393,955. Patented Oct. 18, 1921.
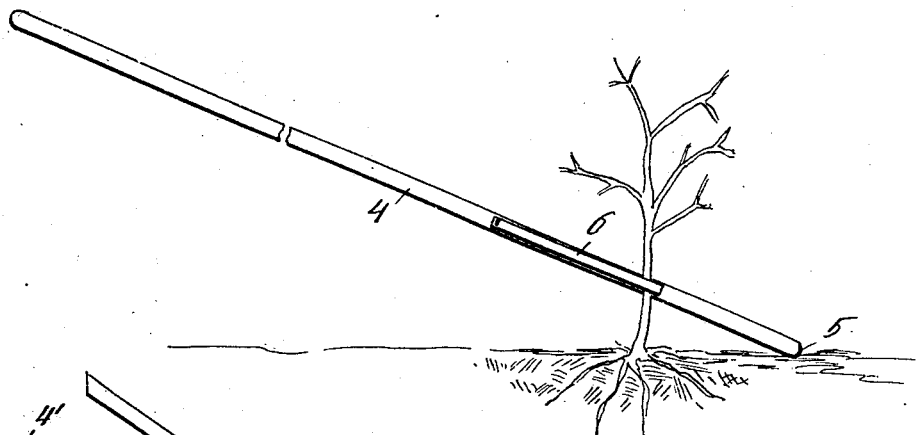
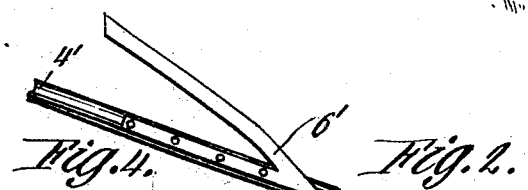
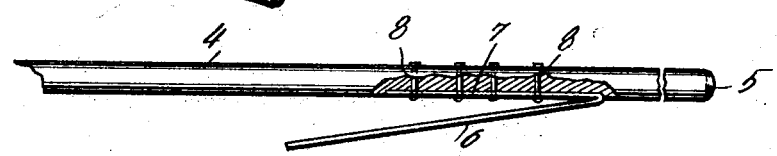
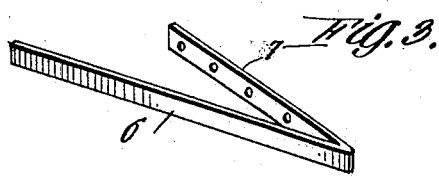
WITNESSES Thomas H. Monk INVENTOR.
BY
ATTORNEY.

UNITED STATES PATENT OFFICE.

THOMAS H. MONK, OF TALLAHASSEE, FLORIDA.

COTTON-STALK PULLER.

1,393,955.

Specification of Letters Patent.   Patented Oct. 18, 1921.

Application filed September 25, 1920.   Serial No. 412,790.

*To all whom it may concern:*

Be it known that I, THOMAS H. MONK, a citizen of the United States, residing at Tallahassee, in the county of Leon and State of Florida, have invented certain new and useful Improvements in Cotton-Stalk Pullers, of which the following is a specification.

This invention relates to cotton stalk pullers.

It is well known that the roots of cotton stalks serve as habitats for the boll weevil, as well as other destructive insects, and furthermore, it is well known that failure to remove the roots of the stalk curtails production of the ensuing crop. Consequently, it is the principal object of this invention to provide an implement capable of considerable leverage to facilitate uprooting of the stalk.

The above and other objects of this invention will be in part described and in part understood from the following description of the present preferred embodiment of the invention taken in connection with the accompanying drawings, wherein:

Figure 1 is a side elevational view of an implement constructed in accordance with my invention illustrating its application.

Fig. 2 is a fragmentary top plan view thereof, a portion of the handle being broken away to disclose details, Fig. 3 is a perspective view of the stalk embracing member, and Fig. 4 is a fragmentary perspective view of a modified form.

The device of my invention consists of an elongated handle 4 preferably made of wood and preferably of a cylindrical configuration. One end 5 of the handle is rounded as shown to advantage in Fig. 2.

The stalk embracing member is indicated at 6 and consists of a metallic strap, one end 7 of which is detachably secured to the handle by means of nuts and bolts 8. It will be observed, upon reference to Fig. 2 of the drawings, that this end of the strap is preferably countersunk in the handle to reduce possibility of the strap moving longitudinally and furthermore, to prevent contact of the cotton stalk with the terminal of the member as the stalk is being slid thereinto. The opposite end of said strap is reversely folded at an acute angle to provide a substantially V-shaped structure. The free end of the strap extends appreciably beyond the secured end thereof, as shown to advantage in Fig. 2.

In use, the rounded end 5 of the handle is placed in contact with the earth adjacent the cotton stalk as illustrated in Fig. 1. In this position the stalk is engaged in the apex of the embracing member, pursuant to which the handle is elevated, extracting the stalk in an obvious manner. When using the handle in this way, it will be understood that the rounded end 5 acts as a fulcrum point and by using a long handle, such as is illustrated in the drawings, the desired leverage will be obtained for removing the stalk without difficulty.

In Fig. 4 of the drawing, the stalk puller is formed so that its longitudinal edges will lie opposite. In this form of the invention, the stalk embracing member is indicated at 6' and is detachably secured to the periphery of a handle 4' or else mortised in the latter. The proximate longitudinal edges are engageable with the stalk to pull the latter. The use of the device is the same as that above described for use of the form shown in Figs. 1 to 3.

What is claimed is:

A cotton stalk puller including a handle, a stalk embracing member consisting of a strap, one end of which is countersunk in the handle and detachably connected thereto, the other end of the strap being bent acutely to provide a substantially V-shaped structure for engagement with the stalk.

In testimony whereof I affix my signature in presence of two witnesses.

THOMAS H. MONK.

Witnesses:
J. O. COLLINS, Jr.,
JOHN CHOATE.